US008620557B2

(12) United States Patent
Johansson et al.

(10) Patent No.: US 8,620,557 B2
(45) Date of Patent: *Dec. 31, 2013

(54) METHOD AND MODULE FOR DETERMINING OF VELOCITY REFERENCE VALUES FOR A VEHICLE CONTROL SYSTEM

(75) Inventors: Oskar Johansson, Stockholm (SE); Jörgen Hansson, Hägersten (SE); Henrik Pettersson, Södertälje (SE)

(73) Assignee: Scania CV AB (SE)

(*) Notice: Subject to any disclaimer, the term of this patent is extended or adjusted under 35 U.S.C. 154(b) by 35 days.

This patent is subject to a terminal disclaimer.

(21) Appl. No.: 13/377,175

(22) PCT Filed: May 31, 2010

(86) PCT No.: PCT/SE2010/050593
§ 371 (c)(1),
(2), (4) Date: Dec. 9, 2011

(87) PCT Pub. No.: WO2010/144030
PCT Pub. Date: Dec. 16, 2010

(65) Prior Publication Data
US 2012/0089312 A1  Apr. 12, 2012

(30) Foreign Application Priority Data
Jun. 10, 2009 (SE) .................................... 0950439

(51) Int. Cl.
*G05D 1/00* (2006.01)
(52) U.S. Cl.
USPC .......................................................... 701/93
(58) Field of Classification Search
USPC ......................................................... 701/1, 93
See application file for complete search history.

(56) References Cited

U.S. PATENT DOCUMENTS 6,076,036 A * 6/2000 Price et al. .................. 701/93
6,306,062 B1 * 10/2001 Toukura et al. ............ 477/107
(Continued)

FOREIGN PATENT DOCUMENTS

EP  1736797 A1  12/2006
EP  1885576 B1 * 5/2011  ............ B60K 31/00
(Continued)

OTHER PUBLICATIONS

International Search Report dated Sep. 10, 2010, issued in corresponding international application No. PCT/SE2010/050593.

*Primary Examiner* — Mary Cheung
*Assistant Examiner* — Anne Mazzara
(74) *Attorney, Agent, or Firm* — Ostrolenk Faber LLP

(57) ABSTRACT

A method for determining speed set-point values $v_{ref}$ for a vehicle's control systems including determining a horizon from position data and map data of an itinerary made up of route segments with at least one characteristic for each segment; calculating threshold values for the characteristic of segments according to one or more vehicle-specific values, which threshold values serve as boundaries for assigning segments to various categories; comparing the characteristic of each segment with the calculated threshold values and placing each segment within the horizon in a category calculating set-point values for the vehicle's control systems across the horizon according to rules pertaining to the categories. When any characteristic in segments within the horizon indicates a hindrance, calculating the vehicle's retardation determining a start position within the horizon for commencement of retardation according to its calculated retardation in order to achieve a lowering of the set-point speed $v_{ref}$ to a maximum speed required by the hindrance at the location of the hindrance; adapting the speed set-point values $v_{ref}$ within the horizon according to the start position and retardation of the vehicle and regulating the vehicle's speed according to the speed set-values $v_{ref}$. Also a module determines set-point values for a control system in the vehicle.

18 Claims, 5 Drawing Sheets

(56) References Cited

U.S. PATENT DOCUMENTS

| | | | |
|---|---|---|---|
| 6,990,401 B2 * | 1/2006 | Neiss et al. | 701/96 |
| 7,050,898 B2 * | 5/2006 | Ono et al. | 701/70 |
| 7,162,353 B2 * | 1/2007 | Minowa et al. | 701/96 |
| 7,548,812 B2 * | 6/2009 | Guenthner et al. | 701/93 |
| 8,055,427 B2 * | 11/2011 | Shin | 701/93 |
| 2004/0068359 A1 | 4/2004 | Neiss et al. | |
| 2004/0084237 A1 * | 5/2004 | Petrie, Jr. | 180/170 |
| 2004/0153233 A1 * | 8/2004 | Minowa et al. | 701/96 |
| 2007/0265759 A1 * | 11/2007 | Salinas et al. | 701/93 |
| 2008/0221776 A1 | 9/2008 | McClellan | |
| 2009/0037070 A1 * | 2/2009 | Nakamura | 701/96 |
| 2010/0161195 A1 * | 6/2010 | Shin | 701/93 |

FOREIGN PATENT DOCUMENTS

| | | | | |
|---|---|---|---|---|
| JP | 07117524 A | | 5/1995 | |
| JP | 2003130653 A | * | 5/2003 | G01C 21/00 |
| SE | 529578 C2 | | 9/2007 | |

\* cited by examiner

METHOD AND MODULE FOR DETERMINING OF VELOCITY REFERENCE VALUES FOR A VEHICLE CONTROL SYSTEM

CROSS-REFERENCE TO RELATED APPLICATIONS

The present application is a 35 U.S.C. §§371 national phase conversion of PCT/SE2010/050593, filed May 31, 2010, which claims priority of Swedish Application No.0950439-0, filed Jun. 10, 2009, the contents of which are incorporated by reference herein. The PCT International Application was published in the English language.

FIELD OF THE INVENTION

The present invention relates to a method and a module for determining speed set-point values for a vehicle's control systems.

BACKGROUND TO THE INVENTION

Many vehicles today are equipped with a cruise control to make it easier for the driver to drive the vehicle. The desired speed can then be set by the driver, e.g. via a control device in the steering wheel console, and a cruise control system in the vehicle acts thereafter upon a control system so that it accelerates and brakes the vehicle in order to maintain a desired speed. If the vehicle is equipped with an automatic gear change system, the vehicle's gears are changed so that the vehicle can maintain the desired speed.

When a cruise control is used in hilly terrain, the cruise control system will try to maintain a set speed on upgrades. This results inter alia in the vehicle accelerating over the crest of a hill and possibly into a subsequent downgrade, making it necessary to brake to avoid exceeding the set speed, which is a fuel-expensive way of running the vehicle.

By varying the vehicle's speed in hilly terrain it is possible to save fuel as compared with a conventional cruise control. This may be done in various ways, e.g. by calculations of the vehicle's current state (as with Scania Ecocruise®). If an upgrade is calculated, the system then accelerates the vehicle uphill. Towards the end of the climb, the system is programmed to avoid acceleration until the gradient has levelled out at the top, provided that the vehicle's speed does not drop below a certain level. Lowering the speed at the end of an upgrade makes it possible to regain speed on a subsequent downgrade without using the engine to accelerate. When the vehicle approaches the bottom of a dip, the system endeavours to use kinetic energy to embark on the next upgrade at a higher speed than an ordinary cruise control. The system will easily provide acceleration at the end of the downgrade in order to maintain the vehicle's momentum. In undulating terrain, this means that the vehicle starts the next climb at a higher speed than normal. Avoiding unnecessary acceleration and using the vehicle's kinetic energy makes it possible to save fuel.

Cruise controls are not usually adapted to adapting vehicle speed to cater for, for example, speed limits or roundabouts and intersections ahead. This means that even if they try to control the vehicle's speed for the sake of economic running by varying it in hilly terrain and reducing it for comfort and safety at bends, the driver has sometimes him/herself to interrupt, e.g. because the permissible speed is lowered by a traffic sign.

If the topology ahead is made known by the vehicle having map data and GPS, such a system can be made more robust and can also change the vehicle's speed in anticipation.

Published patent application US 2008/0221776 describes a system for changing the settings of the engine's ECM (electronic control module) in order to optimise the engine's characteristics with regard to fuel consumption according to attendant circumstances such as topography, road characteristics and roadworks. The vehicle's geographical position is determined by GPS.

The object of the present invention is to propose an improved cruise control which caters for hindrances ahead and thereby reduces the vehicle's fuel consumption.

SUMMARY OF THE INVENTION

The object described above is achieved by a method for determination of speed set-point values $v_{ref}$ for a vehicle's control systems which comprises:
A) determining a horizon by means of position data and map data of an itinerary made up of route segments with at least one characteristic for each segment;
B) calculating threshold values for said at least one characteristic of segments according to one or more vehicle-specific values, which threshold values serve as boundaries for assigning segments to various categories;
C) comparing said at least one characteristic of each segment with the calculated threshold values and placing each segment in a category according to the results of the comparisons;
D) calculating speed set-point values $v_{ref}$ for the vehicle's control systems across the horizon according to rules pertaining to the categories in which segments within the horizon are placed;

and when any characteristic in segments within the horizon indicates a hindrance, the following steps are performed:
E) calculating the vehicle's retardation on the supposition that the brakes are not used according to said rules pertaining to the segment categories;
F) determining a start position within the horizon for commencement of retardation of the vehicle according to its calculated retardation in order to achieve a lowering of the set-point speed $v_{ref}$ to a maximum speed required by the hindrance at the location of the hindrance;
G) adapting the speed set-point values $v_{ref}$ within the horizon according to said start position and retardation of the vehicle;
H) regulating the vehicle's speed according to the speed set-values $v_{ref}$.

The invention relates also to a module for determination of speed set-values $v_{ref}$ for a vehicle's control systems, which module comprises a horizon unit adapted to determining a horizon by means of position data and map data of an itinerary made up of segments with at least one characteristic for each segment;

the module comprises also a processor unit adapted to:
calculating threshold values for said at least one characteristic of segments according to one or more vehicle-specific values, which threshold values serve as boundaries for assigning segments to various categories;
comparing said at least one characteristic of each segment with the calculated threshold values and placing each segment in a category according to the results of the comparisons;

calculating speed set-point values $v_{ref}$ for the vehicle's control systems across the horizon according to rules pertaining to the categories in which segments within the horizon are placed;

the module further comprises a hindrance unit adapted to performing the following steps when any characteristic in segments within the horizon indicates a hindrance:

calculating the vehicle's retardation on the supposition that the brakes are not used according to said rules pertaining to the segment categories; and determining a start position within the horizon for commencement of retardation of the vehicle according to its calculated retardation in order to achieve a lowering of the set-point speed $v_{ref}$ to a maximum speed required by the hindrance at the location of the hindrance;

the processor unit is further adapted to adapting the speed set-values $v_{ref}$ within the horizon according to said start position and retardation of the vehicle; and the control system regulates the vehicle's speed according to the speed set-values $v_{ref}$.

If it knows the nature of the road on which the vehicle will travel and the distance from the vehicle to any hindrances, e.g. speed limits, roundabouts, aqueducts, bridges, traffic signs, traffic lights, roadworks, traffic accidents etc. within the horizon ahead, the module can determine speed set-point values or recommend a vehicle speed for reducing unnecessary sequences of speed increase followed by braking. Reduced fuel consumption is thus achieved when the need for braking before speed changes, intersections etc. is reduced by the speed being lowered in due time on the basis of predicted speed set-values $v_{ref}$.

Reducing the use of the brakes reduces also the wear on the brakes and lengthens their service life.

If the vehicle is equipped with a navigation system, the vehicle's itinerary can be determined in advance. The vehicle need then only predict speed set-point values for one route instead of a number of conceivable itineraries and can save processor load, memory utilisation and CAN (controller area network) traffic by following the itinerary chosen by the navigation system.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Information about a vehicle's itinerary can be used to regulate its speed in anticipation in order to save fuel, increase safety and enhance comfort. Topography greatly affects the control of, in particular, the driveline of heavy vehicles, since much more torque is required uphill than downhill and to make it possible to climb some hills without changing gear. Future hindrances which require the vehicle to reduce speed affect fuel consumption and increase brake wear, since the vehicle's driver often sees the hindrance so late that he/she is forced to brake the vehicle in order to achieve the right speed at the hindrance. Knowledge of where such hindrances are situated makes it possible for the vehicle's speed to be regulated in anticipation.

The vehicle is provided with a positioning system and map information, and position data from the positioning system and topology data from the map information are used to construct a horizon which represents the nature of the itinerary. In the description of the present invention, GPS (Global Positioning System) is indicated for determining position data for the vehicle, but it should be appreciated that other kinds of global or regional positioning systems are also conceivable to provide the vehicle with position data, e.g. systems which use a radio receiver to determine the vehicle's position. The vehicle may also use sensors to scan the surroundings and thereby determine its position.

Figure 1:
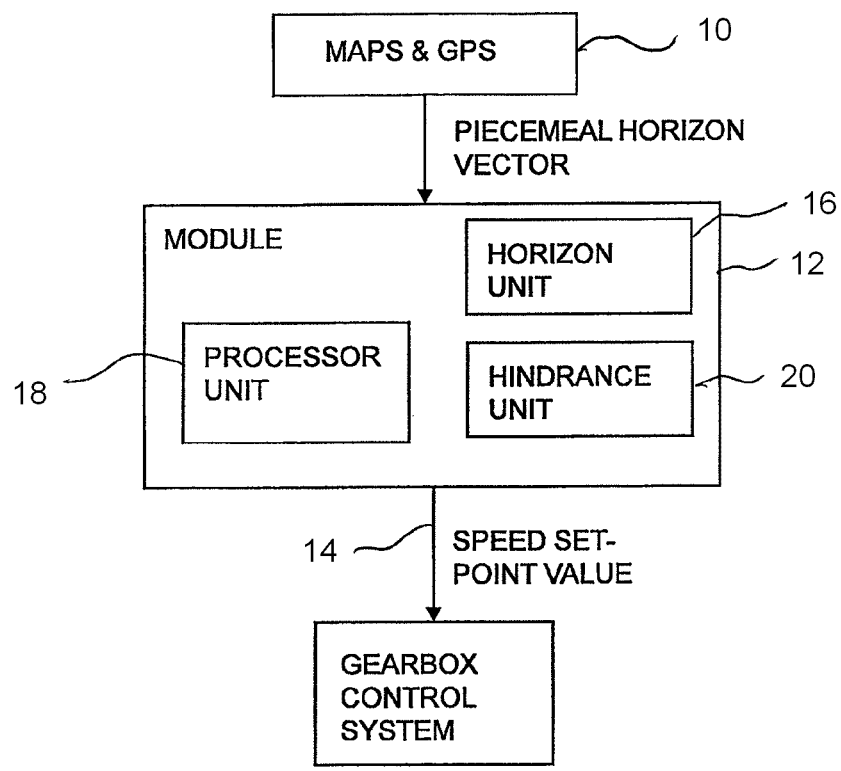
FIG. 1 depicts the functional context of the regulating module in the vehicle according to an embodiment of the invention.

FIG. 1 illustrates how a unit incorporates map and GPS information 10 about the itinerary. The itinerary is exemplified below as a single route for the vehicle but it should be appreciated that information about various conceivable itineraries may be incorporated via maps and GPS or other positioning systems.

According to an embodiment of the invention, the vehicle is equipped with a navigation system 10 by means of which the itinerary for the vehicle is determined. The driver can for example register a starting point and a destination point and the system will guide him/her to the destination by the quickest or shortest route. The navigation system uses for example a digital map, position information from a GPS receiver, the vehicle's speedometer and a compass gyro and guides the driver towards the destination visually on a screen. The navigation system may be equipped to provide dynamic information by RDS TMC (Radio Data System Traffic Message Channel), which is a way of conveying traffic information digitally via the ordinary FM radio network. Dynamic navigation by means of RDS TMC caters for the traffic situation when the vehicle is on the move, and if for example the driver's planned route is blocked because an accident has occurred the navigation system can receive this information via RDS TMC and propose an alternative route. Most navigators also have information about roadworks, so information about their position can be received and the driver can know about them in good time.

The route chosen by the navigation system may be run jointly with the driver's itinerary, in which case horizons need not be constructed for every possible itinerary, since only the itinerary chosen by the navigation system need be presented. This leads to reduced processor load, memory utilisation and CAN traffic in the vehicle, since information about alternative itineraries need not be stored or processed.

The itinerary or, if there are two or more possible alternatives, the itineraries are sent bit by bit via CAN to a module 12 for determination of speed set-point values 14, which module may be separate from or form part of the system which is to use the speed set-point values for regulating the vehicle's speed, e.g. an engine control system. Alternatively, the unit with maps and a positioning system may also be part of the system which uses the speed set-point values for regulating. In the regulating module 12, the bits are put together in a horizon 16 unit to form a horizon and are processed by the processor unit 18 to create an internal horizon by which the control system can regulate. If there are two or more alternative itineraries, a number of internal horizons are created for the various alternatives. The horizon is then continually supplemented by new bits from the unit with GPS and map data to maintain a desired length of horizon. The horizon is thus updated continuously when the vehicle is in motion.

CAN (controller area network) is a serial bus system specially developed for use in vehicles. The CAN data bus makes digital data exchange possible between sensors, regulating components, actuators, control devices, etc. and ensures that two or more control devices can have access to the signals from a given sensor in order to use them to control components connected to them.

Figure 2:
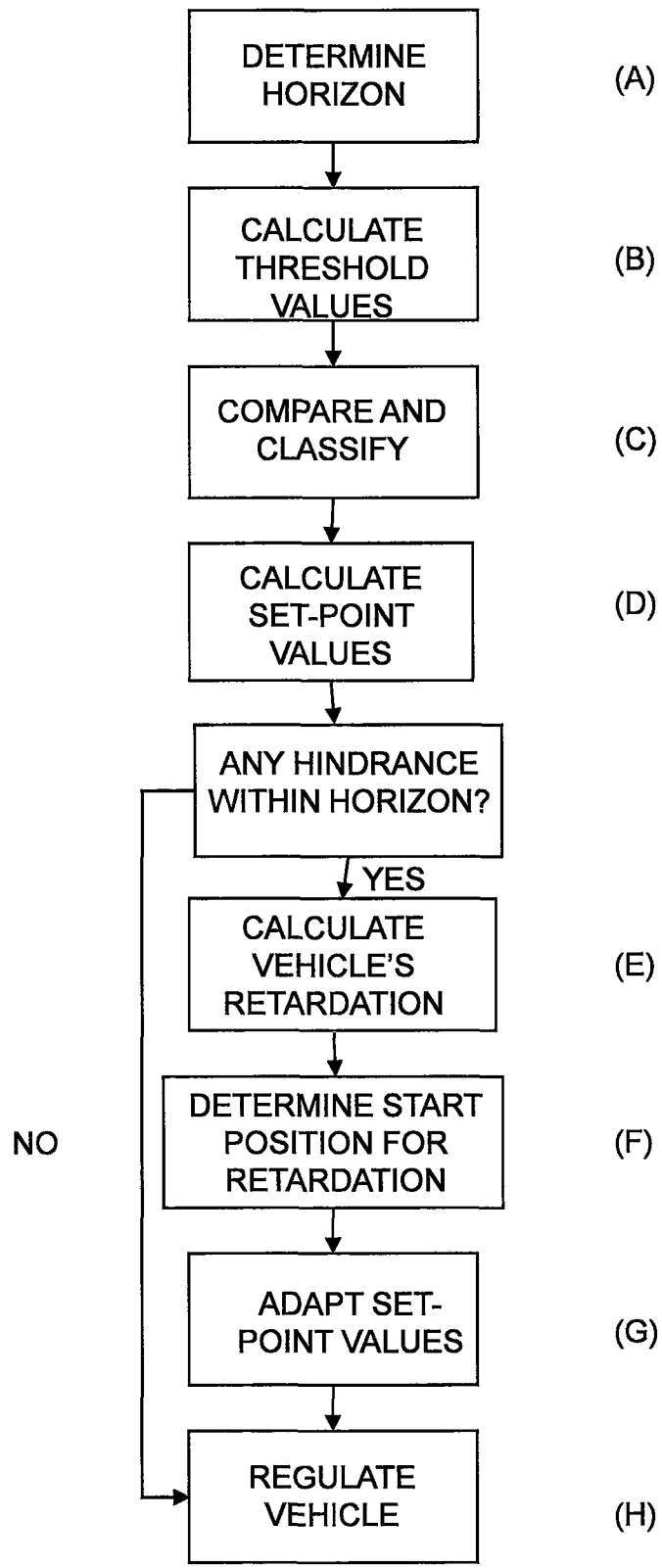
FIG. 2 depicts a flowchart for the method according to an embodiment of the invention.

FIG. 2 is a flowchart of the steps which the method according to an embodiment of the invention comprises. The example described below refers to only one horizon but it should be appreciated that two or more horizons for various alternative itineraries may be constructed in parallel. A first step A) determines a horizon based on position data and map data of an itinerary made up of route segments with at least one characteristic for each segment. When the vehicle is on the move, the horizon module puts the bits together to form a horizon of the itinerary, the length of the horizon being typically of the order of 1 to 2 km. The horizon unit keeps track of where the vehicle is and continually adds to the horizon so that the length of the horizon is kept constant. According to an embodiment, when the destination point of the journey is within the length of the horizon, the horizon is no longer added to, since travelling beyond the destination point is not relevant.

The horizon is made up of route segments which have one or more inter-related characteristics. The horizon is here exemplified in matrix form in which each column contains a characteristic for a segment. A matrix covering 80 m forwards of an itinerary may take the following form:

$$\begin{bmatrix} dx, & \% \\ 20, & 0.2 \\ 20, & 0.1 \\ 20, & -0.1 \\ 20, & -0.3 \end{bmatrix},$$

where the first column is the length of each segment in meters (dx) and the second column the gradient in % of each segment. The matrix is to be taken to mean that for 20 meters forwards from the vehicle's current position the gradient is 0.2%, followed by 20 meters with a gradient of 0.1%, and so on. The values for segments and gradients need not be expressed in relative values but may instead be expressed in absolute values. The matrix is with advantage vector-formed but may instead be of pointer structure, in the form of data packages or the like. There are various other conceivable characteristics, e.g. radius of curvature, traffic signs, various hindrances etc.

If the horizon comprises hindrances in the form of road signs, roadworks etc., the matrix may take the following form:

$$\begin{bmatrix} dx, & \%, & h \\ 20, & 0.2, & \\ 20, & 0.1, & \\ 20, & -0.1, & 70 \\ 20, & -0.3, & \end{bmatrix},$$

where column h contains a hindrance in the form of a road sign showing speed limit 70 km/h. If the horizon has radii of curvature as a characteristic, high calculated lateral acceleration values for example may constitute a hindrance. Hindrance characteristics along the itinerary need not be in the same matrix as the horizon but may be sent as separate amounts of data to a module 20 depicted in FIG. 1, together with a distance of the hindrance from the vehicle. Information about hindrances may also be provided via the vehicle's navigation system if the vehicle is equipped with it. Characteristics representing hindrances received via a navigation system may for example be roadworks or accidents. A characteristic indicates a hindrance by depicting for example a speed limit, a sharp bend, a roundabout, an intersection, roadworks etc.

Thereafter, segments within the horizon are placed in various categories in a step B) in which threshold values are calculated for said at least one characteristic of segments according to one or more vehicle-specific values, which threshold values serve as boundaries for assigning segments to different categories. In the example where the characteristics of segments are gradients, threshold values are calculated for their gradient.

The threshold values for the characteristic concerned are calculated, according to an embodiment of the invention, by one or more vehicle-specific values, e.g. current transmission ratio, current vehicle weight, the engine's maximum torque curve, mechanical friction and/or the vehicle's running resistance at current speed. A vehicle model internal to the control system is used to estimate running resistance at current speed. Transmission ratio and maximum torque are known magnitudes in the vehicle's control system, and vehicle weight is estimated on-line.

The following are examples of five different categories in which segments may be placed when the gradient of segments is used for taking decisions about the control of the vehicle:

Level road: Segment with gradient 0±a tolerance.

Steep upgrade: Segment with too steep a gradient for the vehicle to maintain speed in current gear.

Gentle upgrade: Segment with gradient between tolerance and threshold value for sharp upgrade.

Steep downgrade: Segment with such a steep downhill gradient that the vehicle is accelerated by the gradient.

Gentle downgrade: Segment with a downward gradient between the negative tolerance and the threshold value for sharp downgrade.

According to an embodiment of the invention, the characteristics of segments are their length and gradient, and placing segments in the categories described above involves calculating threshold values in the form of two gradient threshold values $1_{min}$ and $1_{max}$, where $1_{min}$ is the minimum gradient for the vehicle to be accelerated by the gradient downhill, and $1_{max}$ is the maximum gradient at which the vehicle can maintain speed without changing gear uphill. Thus the vehicle can be regulated according to the gradient and length of the road ahead so that it can be driven in a fuel economising way by means of cruise control in undulating terrain. In another embodiment, the characteristics of the segments are their length and lateral acceleration, and threshold values are calculated in the form of lateral acceleration threshold values which classify segments by how much lateral acceleration they cause. The segments would then be delineated by lateral acceleration. The vehicle's speed can thereafter be regulated so that it can be driven in a way suited to fuel economy and traffic safety with regard to road curvature, i.e. any speed reduction before a bend is as far as possible effected without use of service brakes.

For example, the tolerance for the "level road" category is preferably between 0.05% and −0.05% when the vehicle travels at 80 km/h. On the basis of the same speed (80 km/h), $1_{min}$ is usually calculated to be of the order of −2 to −7%, and $1_{max}$ usually 1 to 6%. However, these values depend greatly on current transmission ratio (gear+fixed rear axle ratio), engine performance and total weight.

In a next step C) of the method, at least one characteristic of each segment, in this case the gradient, is compared with the calculated threshold values, and each segment is placed in a category according to the results of the comparisons.

After each segment within the horizon has been placed in a category, an internal horizon for the control system can be constructed on the basis of the classification of segments and the horizon, comprising for each segment entry speeds $v_i$ which the control system has to abide by. According to an embodiment, a speed change requested between two entry speeds $v_i$ is ramped in order to provide the control system with set-point values $v_{ref}$ which effect a gradual increase or decrease of the vehicle's speed. Ramping a speed change results in calculation of gradual speed changes which need to be made in order to achieve the speed change. In other words, ramping results in a linear speed increase. The entry speeds $v_i$, i.e. speed set-point values $v_{ref}$ for the vehicle's control systems, are calculated in a step D) according to the method according to the invention across the horizon according to rules pertaining to the categories in which segments within the horizon are placed. The rules pertaining to the segment categories are explained below. When a characteristic in segments within the horizon indicates a hindrance, the following steps are performed: E) calculating the vehicle's retardation on the supposition that the brakes are not used according to said rules pertaining to the segment categories, and F) determining a start position within the horizon for commencement of retardation of the vehicle according to its calculated retardation in order to achieve a lowering of the set-point speed $v_{ref}$ to a maximum speed required by the hindrance at the location of the hindrance. Adaptation of the speed set-values $v_{ref}$ for the control system with respect to hindrances is thus achieved.

The vehicle's retardation without using the brakes down to a certain speed indicated by a hindrance, e.g. a road sign showing speed limit 70 km/h, is calculated according to the category of the segment in which the vehicle is at the time by using either of formulae (1) or (2) below. When the retardation is thus known, the distance to be travelled while slowing down to a certain speed, herein called the retardation run, can be arrived at. A start position within the horizon for commencement of retardation of the vehicle in order to come down to the speed required because of the hindrance at the location of the hindrance can then be calculated by relating the retardation run to the distance from the hindrance. Lowering the set-point speed $v_{ref}$ to the maximum speed required by the hindrance can thus be achieved at the location of the hindrance without the vehicle braking.

Thereafter, the speed set-values $v_{ref}$ within the horizon are adapted in a step G) according to said start position and retardation of the vehicle. All the segments within the horizon are stepped through continuously, and as new segments are added to the horizon the entry speeds $v_i$ are adjusted in them as necessary within the range of the vehicle's reference speed $v_{set}$. $v_{set}$ is the reference speed set by the driver and desired to be kept by the vehicle's control systems when travelling within a range. The range is bounded by two speeds $v_{min}$ and $v_{max}$ which may be set manually by the driver or be set automatically by calculations of suitable ranges preferably calculated in the regulating module. The speed set-point values within the horizon are thus adapted by $v_{max}$ being set to the speed limit pertaining to the hindrance, at the hindrance. The location for commencement of retardation represents the position within the horizon where the control system has to stop accelerating the vehicle, and a signal to stop accelerating will be sent to the control system at the respective location. The vehicle is thereafter regulated in a step H) according to the speed set-point values, which entails the engine control system in the vehicle regulating the vehicle's speed according to the set-point values. At the location of the hindrance and for a desired distance beyond it the vehicle will accelerate again to maintain the desired speed, with the limitation that $v_{max}$ is set to the maximum speed required by the hindrance.

According to an embodiment, regulating the vehicle's speed to cater for hindrances is an optional setting for the driver. This enables him/her to choose whether the vehicle's speed should be adapted according to hindrances detected, e.g. as a function which can be switched on and off. This is desirable in that a system which always makes the vehicle maintain speed after various speed limits may cause irritation to many drivers.

Figure 3:
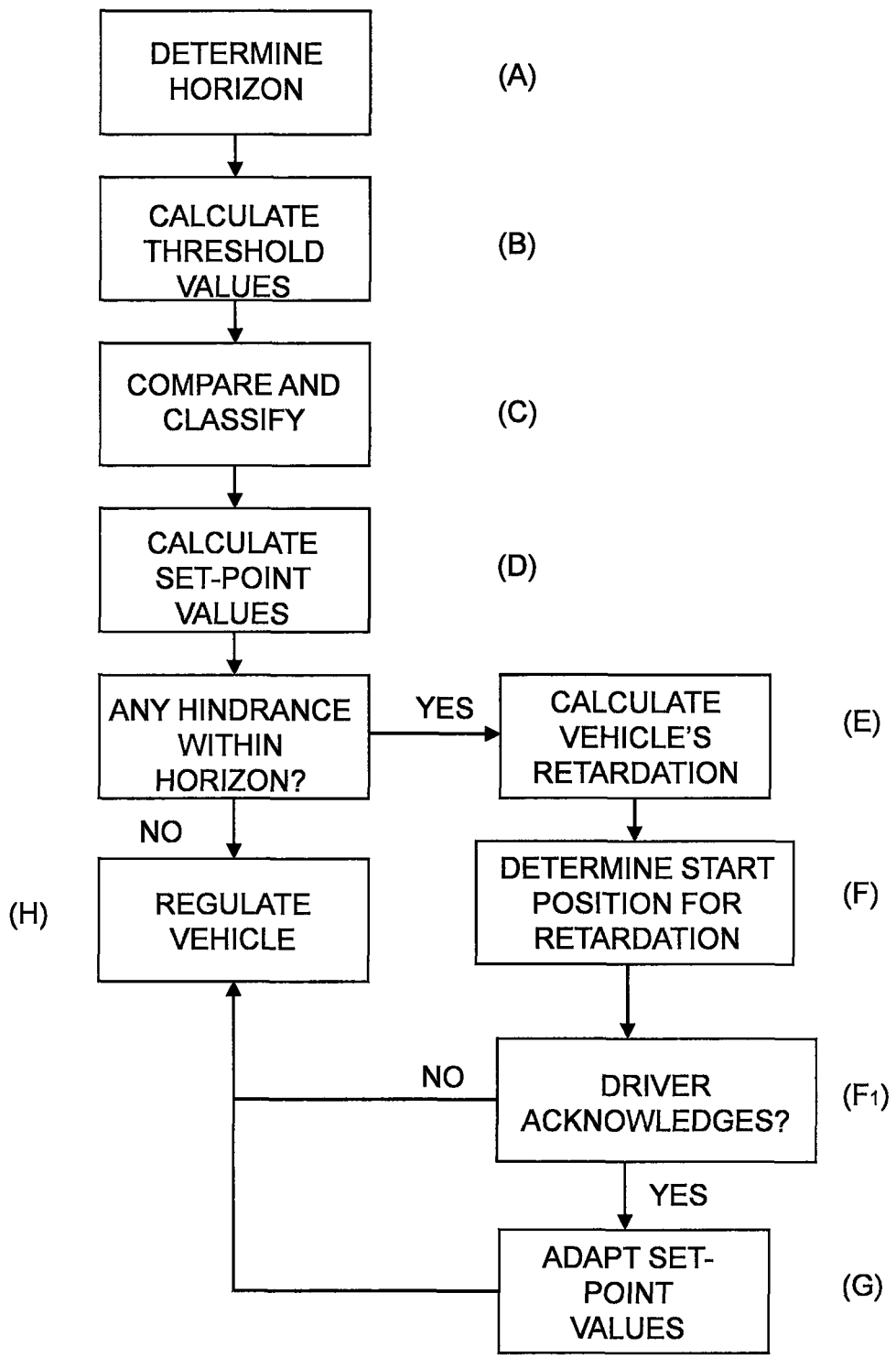
FIG. 3 depicts a flowchart for the method according to another embodiment of the invention.

Alternatively to or in combination with the aforesaid embodiment, the method comprises a step $F_1$) after step F) to indicate for the vehicle's driver that a speed change is coming, and step G) is then performed if the driver so indicates. This embodiment is illustrated by the flowchart in FIG. 3. The driver can thus be made aware of a coming speed change by, for example, an indication in the instrument panel, whereupon he/she may acknowledge whether he/she wishes the new speed to be maintained. The vehicle's speed may of course change before the driver has realised that there is a speed limit due to a hindrance, and he/she thus becomes involved in the choice of speed and understands the reason for the speed change.

Figure 6:
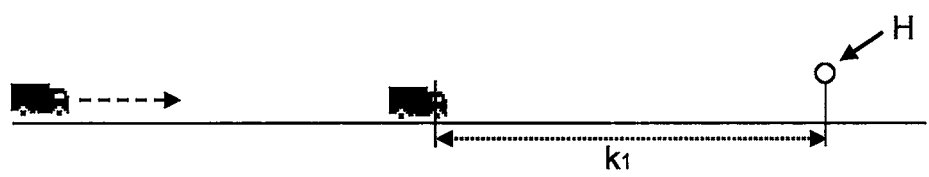
FIG. 6 illustrates driving with a cruise control according to the invention as compared with a traditional cruise control.
Figure 6:
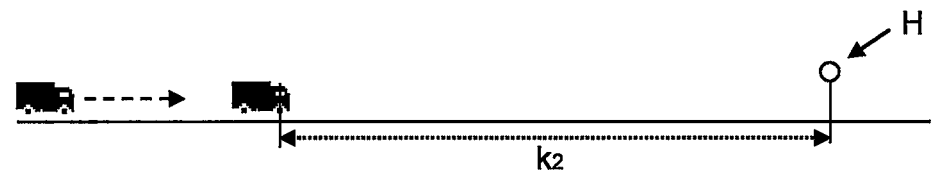

The effects of the invention are illustrated in FIG. 6. The upper diagram shows how the vehicle's speed is regulated by a traditional cruise control. The driver sees the hindrance H from an approximate distance $k_1$ and starts reducing speed by releasing the accelerator and braking. The lower diagram shows how the present invention calculates that the vehicle should stop accelerating a certain distance $k_2$ before the hindrance H to avoid needing to brake energy away. The retardation run in this case is therefore $k_2$. The vehicle's fuel can thus be economised.

According to an embodiment of the invention, the maximum speed required by the hindrance limits the vehicle's speed for a predetermined length of the horizon. This length may be different for different types of hindrance. Thus the limited speed may be maintained for the whole length of the hindrance without an end point having to be indicated for the hindrance. The predetermined length may instead be indicated by a start point and an end point and be calculated on that basis. The end point may for example be indicated by a further road sign showing a higher speed limit, or by the end of a bridge or roadworks.

A characteristic may in some cases be a hindrance and in others not. According to an embodiment of the invention, a characteristic indicates a hindrance due to some other parameter, e.g. temperature. In normal conditions, a bridge need not require any change in the vehicle's speed, but when the temperature is around or below 0° the vehicle's speed needs lowering to reduce the risk of accident due to slippery road surface.

Set-point values $v_{ref}$ for the control system in the vehicle may be allowed to vary between the two abovementioned speeds $v_{min}$ and $v_{max}$. When the regulating module predicts an internal horizon for the vehicle's speed, the vehicle's speed may then vary within this range.

The various rules for the segment categories therefore regulate how the entry speed $v_i$ for each segment is to be adjusted. If a segment is placed in the "level road" category, no change will take place in the entry speed $v_i$ to the segment. In contrast, if $v_i$ is not the same as $v_{set}$, the speed set-point values will be ramped to $v_{set}$ with comfort requirement, to maintain the speed desired by the driver. Driving the vehicle such that comfort requirements are met involves using Torricelli's equation as below to calculate the constant acceleration or retardation which needs to be applied to the vehicle:

$$v_{slut}^2 = v_i^2 + 2 \cdot a \cdot s \quad (1)$$

where $v_i$ is the entry speed to the segment, $v_{slut}$ the vehicle's speed at the end of the segment, a the constant acceleration/retardation and s the length of the segment.

If a segment is in the "steep upgrade" or "steep downgrade" category, the final speed $v_{slut}$ for the segment is predicted by solving equation (2) below:

$$v_{slut}^2 = (a \cdot v_i^2 + b) \cdot (e^{(2 \cdot a \cdot s/M)} - b)/a \quad (2)$$

where $$a = -C_d \cdot \rho \cdot A/2 \quad (3)$$

$$b = F_{track} - F_{roll} - F_\alpha \quad (4)$$

$$F_{track} = (T_{eng} \cdot i_{final} \cdot i_{gear} \cdot \mu_{gear})/r_{wheel} \quad (5)$$

$$F_{roll} = \text{flatCorr} \cdot M \cdot g/1000 \cdot (C_{rrisoF} + C_b \cdot (v_i - v_{iso}) + C_{aF} \cdot (v_i^2 - v_{iso}^2)) \quad (6)$$

$$F_\alpha = M \cdot g \cdot \sin(\arctan(\alpha)) \quad (7)$$

$$\text{flatCorr} = 1/\sqrt{(1 + r_{wheel}/2.70)} \quad (8)$$

where $C_d$ is the air resistance coefficient, $\rho$ the density of the air, A the largest cross-sectional area of the vehicle, $F_{track}$ the force acting from the engine torque in the vehicle's direction of movement, $F_{roll}$ the force from the rolling resistance acting upon the wheels, $F_\alpha$ the force acting upon the vehicle because of the gradient a of the segment, $T_{eng}$ the engine torque, $i_{final}$ the vehicle's final gear, $i_{gear}$ the current transmission ratio in the gearbox, $\mu_{gear}$ the efficiency of the gear system, $r_{wheel}$ the vehicle's wheel radius, M the vehicle's weight, $C_{aF}$ and $C_b$ speed-dependent coefficients related to the rolling resistance of the wheels, $C_{rrisoF}$ a constant term related to the rolling resistance of the wheels and $V_{iso}$ an ISO speed, e.g. 80 km/h.

On segments in the "steep upgrade" category, the final speed $v_{slut}$ is thereafter compared with $v_{min}$, and if $v_{slut} < v_{min}$, then $v_i$ has to be increased so that $$v_i = \min(v_{max}, v_i + (v_{min} - v_{slut})) \quad (9)$$

otherwise no change in $v_i$ takes place, since $v_{slut}$ meets the requirement of being within the range for the reference speed.

On segments in the "steep downgrade" category, the final speed $v_{slut}$ is compared with $v_{max}$, and if $v_{slut} > v_{max}$, then $v_i$ has to be decreased so that $$v_i = \max(v_{min}, v_i - (v_{slut} - v_{max})) \quad (10)$$

otherwise no change in $v_i$ takes place, since $v_{slut}$ meets the requirement of being within the range for the reference speed.

Torricelli's formula (1) is here again used to calculate whether it is possible to achieve $v_{slut}$ with the entry speed $v_i$ with comfort requirement, i.e. with predetermined maximum constant acceleration/retardation. If this is not possible because of the length of the segment, $v_i$ is increased or decreased so that the comfort requirement, i.e. not too much acceleration/retardation, can be maintained.

On segments in the "gentle upgrade" category, the set-point value $v_{ref}$ is allowed to vary between $v_{min}$ and $v_{set}$ when a new segment is incorporated, i.e. $v_{min} \leq v_{ref} \leq v_{set}$. If $v_{ref} \geq v_{min}$, no acceleration of the vehicle is effected. If however $v_{ref} < v_{min}$, then $v_{ref}$ is applied to $v_{min}$ during the segment, or if $v_{ref} > v_{set}$, then $v_{ref}$ is ramped towards $v_{set}$ by means of equation (1). On segments in the "gentle downgrade" category, $v_{ref}$ is allowed to vary between $v_{set}$ and $v_{max}$ when a new segment is incorporated, i.e. $v_{set} \leq v_{ref} \leq v_{max}$, and if $v_{ref} \leq v_{max}$ no retardation of the vehicle is effected. If however $v_{ref} > v_{max}$, then $v_{ref}$ is applied to $v_{max}$ during the segment, or if $v_{ref} < v_{set}$, then $v_{ref}$ is ramped towards $v_{set}$ by means of equation (1). The five segment categories above may be simplified to three by deleting "gentle upgrade" and "gentle downgrade". The "level road" category will then cover a larger range bounded by the calculated threshold values $1_{min}$ and $1_{max}$, so the gradient on the segment has to be smaller than $1_{min}$ if the gradient is negative or greater than $1_{max}$ if the gradient is positive.

When a segment which comes after a segment within the horizon which is in the "gentle upgrade" or "gentle downgrade" category causes a change in the entry speeds to segments in those categories, it may mean that entry speeds and hence the set-point speeds for the control system are corrected and become higher or lower than as indicated by the above rules for the "gentle upgrade or "gentle downgrade" categories. This therefore applies when the entry speeds to segments are corrected according to subsequent segments.

The vehicle's retardation down to a certain speed indicated by a hindrance, e.g. a road sign showing speed limit 70 km/h, is calculated according to the category of the respective segment in which the vehicle is at the time by using either of formulae (1) or (2) above. When the retardation is thus known, the distance to be travelled while slowing down to a certain speed, herein called the retardation run, can be arrived at. A start position within the horizon for commencement of retardation of the vehicle in order to come down to the speed required because of the hindrance at the location of the hindrance can then be calculated by relating the retardation run to the distance from the hindrance. Lowering the set-point speed $v_{ref}$ to the maximum speed required by the hindrance can thus be achieved at the location of the hindrance.

All speed changes requested are therefore ramped by means of Torricelli's equation (1) so that they take place with comfort requirement. Thus it is a general rule not to raise the set-point speed $v_{ref}$ on an upgrade, since any possible speed increase of $v_{ref}$ has to take place before the climb begins if the vehicle is to be driven in a cost-effective way. For the same reason, the set-point speed $v_{ref}$ should not be lowered on a downgrade, since any possible speed decrease of $v_{ref}$ has to take place before the downhill run.

By continuously stepping through all the segments within the horizon, it is possible to determine an internal horizon which provides predicted entry values $v_i$ for each segment. According to an embodiment, step A) is performed continuously so long as the horizon does not exceed a planned itinerary for the vehicle, and steps B) to E) are performed continuously for the whole length of the horizon. The horizon is updated preferably piecemeal, and has according to an embodiment not the same continuity in its updating as steps B) to E). The internal horizon is updated continually as new segments are added to the horizon, e.g. two to three times per second. Continuous stepping through segments within the horizon involves continuously calculating the entry values $v_i$ to each segment, and calculating an entry value $v_i$ may entail having to change entry values both forwards and backwards within the internal horizon. In the same way, when applicable, entry values have to be changed forwards and backwards within the horizon if there is a hindrance within it. Where for example a predicted speed in a segment is outside a set range, it is desirable to correct the speed in preceding segments.

Figure 4:
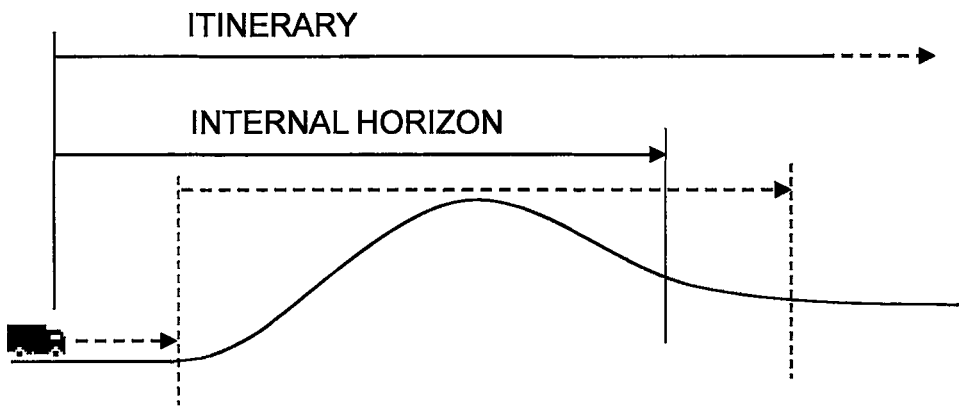
FIG. 4 illustrates the length of a control system's horizon in relation to the length of the itinerary for the vehicle.
Figure 5:
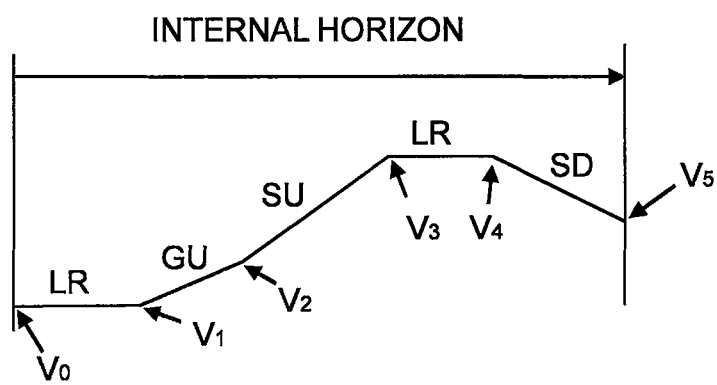
FIG. 5 illustrates the various speeds predicted and the segment categories which are continuously updated as new segments are added to the horizon.

FIG. 4 depicts the internal horizon relative to the itinerary. The internal horizon moves continually forwards as indicated by the broken inner horizon moved forward. FIG. 5 depicts an example of an internal horizon in which the various segments are placed in a category. In the diagram "LR" stands for "level road", "GU" for "gentle upgrade", "SU" for "steep upgrade" and "SD" for "steep downgrade". The speed is initially $v_0$, and if this is not $v_{set}$, the set-point values are ramped from $v_0$ to $v_{set}$ with comfort acceptance according to Torricelli's equation (1) because the category is "level road". The next segment is a "gentle upgrade" and no change in $v_{ref}$ takes place so long as $v_{min} \leq v_{ref} \leq v_{set}$, since no acceleration need be applied in this segment. The next segment is a "steep upgrade", so the final speed $v_3$ for it is predicted by means of formula (2), so $v_2$ has to be increased if $v_3 < v_{min}$ according to formula (9). The next segment is "level road", so $v_{ref}$ is changed towards $v_{set}$ with the limitation of the comfort requirement from Torricelli's equation (1). Thereafter comes a segment which is a "steep downgrade", so the final speed $v_5$ is predicted by means of formula (2) and $v_4$ has to be decreased if $v_5 > v_{max}$ according to formula (10). As soon as a speed backwards in the internal horizon is changed, the remaining speeds backwards in the internal horizon are adjusted to be able to fulfil the speed further forwards. At each speed change which has to be effected, the method according to the invention calculates by means of Torricelli's equation (1) whether it is possible to achieve the speed change with comfort requirement. If not, the entry speed to the segment is adjusted so that comfort requirement can be maintained.

The present invention relates also to a module 12 for catering for hindrances during regulation of a vehicle's speed, as depicted in FIG. 1. The module comprises a horizon unit 16 adapted to determining a horizon by means of received position data and map data of an itinerary made up of route segments with at least one characteristic for each segment. The module further comprises a processor unit 18 adapted to performing method steps B) to D) as described above. The module further comprises a hindrance unit 20 adapted to performing steps E) and F) according to the method described when at least one characteristic of any of the segments within the horizon indicates a hindrance. The processor unit 18 is further adapted to adapting the speed set-values $v_{ref}$ within the horizon according to said start position and retardation of the vehicle, whereupon the control system in the vehicle regulates the vehicle's speed according to the speed set-values $v_{ref}$. The result is a module which can be used in a vehicle to determine speed set-point values which cater for hindrances along the vehicle's route. The module may be part of a control system for which it is intended to determine speed set-point values, or be a freestanding module separate from the control system. The control system, e.g. an engine control system, then regulates the vehicle's speed according to the speed set-point values.

The vehicle-specific values of current transmission ratio, current vehicle weight, the engine's maximum torque curve, mechanical friction and/or the vehicle's running resistance at current speed are preferably determined in the processor unit. The threshold values may therefore be determined on the basis of the vehicle's state at the time. Signals needed for determining these values may be taken from CAN or be detected by suitable sensors.

According to an embodiment, the hindrance unit is adapted to detecting a hindrance within the horizon from the fact that a characteristic for a segment indicates a speed limit, a sharp bend, a roundabout or an intersection etc. The hindrance unit receives information about hindrances in, for example, the piecemeal horizon vector or through other data which represent a distance of the hindrance from the vehicle, a route segment or relative to an external coordinate system. This makes it possible to adapt the vehicle's speed to different kinds of hindrances.

According to another embodiment, the hindrance unit is adapted to determining a distance for which the maximum speed required by the hindrance limits the vehicle's speed. In this case, $v_{max}$ for a section of the route will be set to the maximum speed required by the hindrance, and there may for example be different standard distances for different hindrances. The maximum speed required by the hindrance may according to an embodiment limit the vehicle's speed until, for example, there is within the horizon a further road sign which indicates a different speed for the vehicle to be kept at. This makes it possible to achieve a lowering of the vehicle's speed for a longer distance.

The hindrance unit may be adapted to determining whether the characteristic indicates a hindrance due to some other parameter, e.g. temperature. This caters for the possibility that a bridge which is not usually a hindrance may become a hindrance if the temperature drops below a certain level.

The module's function of catering for hindrances and thereby achieving regulation of the vehicle's speed in order to save fuel and brakes at hindrances is preferably adapted to being an optional setting for the driver. He/she may then switch the function on and off and not be forced to adjust to the traffic situation. The hindrance unit's function will thus be optional. According to an embodiment, the hindrance unit is adapted to indicating for the vehicle's driver that a speed change is coming and to receiving input data which accept or reject the speed change. The indication may for example be presented for the driver on the instrument panel so that he/she can actively say yes to the change.

The horizon unit may according to an embodiment be adapted to determining a horizon of an itinerary which is determined by means of a navigation system. Many vehicles today are equipped with navigation systems, in which case the horizon unit need only construct a horizon for a single itinerary instead of a number of parallel itineraries. This makes it possible inter alia to save processor power.

According to an embodiment, the characteristics of segments are their length and gradient and the processor unit is adapted to calculating the threshold values in the form of gradient threshold values $1_{min}$ and $1_{max}$. Thus the vehicle's speed can be regulated according to the undulation of the itinerary in order to travel in a fuel economising way.

According to another embodiment, the characteristics of segments are their length and lateral acceleration and the processor unit is adapted to calculating the threshold values in the form of lateral acceleration threshold values. This means that the vehicle's speed can be regulated according to the curvature of the road ahead, and the vehicle's speed can be pre-regulated so that unnecessary braking operations and speed increases are minimised in order to save fuel.

The horizon unit is preferably adapted to determining the horizon continuously so long as the horizon does not exceed a planned itinerary for the vehicle, and the processor unit is adapted to continuously performing steps for calculating and updating the set-point values for the control system for the whole length of the internal horizon. In an embodiment, the horizon is thus constructed piecemeal progressively as the vehicle travels along the itinerary. The set-point values for the control system are calculated and updated continuously irrespective of whether new segments are added or not, since the set-point values to be calculated depend also on how the vehicle-specific values of the vehicle change along the itinerary.

The present invention comprises also a computer program product comprising computer programme instructions for enabling a computer system in a vehicle to perform the steps according to the method when the computer program instructions are run on said computer system. The computer program instructions are preferably stored on a medium which is readable by a computer system, e.g. a CD ROM, USB memory, or they may be transmitted wirelessly or by line to the computer system.

The present invention is not limited to the embodiments described above. Various alternatives, modifications and equivalents may be used. The aforesaid embodiments therefore do not limit the scope of the invention which is defined by the attached claims.

The invention claimed is:

1. A method performed by a control system incorporating a computer for determining speed set-point values for a vehicle's control system, the method comprises comprising:
   A) determining a horizon using position data and map data of an itinerary including route segments with at least one characteristic for each segment;
   B) calculating threshold values for said at least one characteristic according to one or more vehicle-specific values,
   C) comparing said at least one characteristic of each segment with the calculated threshold values and assigning each segment within the horizon to a respective category according to the results of the comparisons, wherein the threshold values serve as boundaries for assigning the segments to the respective categories;
   D) calculating speed set-point values $v_{ref}$ for the vehicle's control system across the horizon according to rules pertaining to the categories to which segments within the horizon are assigned; and
      when any characteristic in segments within the horizon indicates a hindrance, performing the following steps:
   E) calculating a retardation of the vehicle on a supposition that the brakes are not used according to said rules pertaining to the segment categories;
   F) determining a start position within the horizon for commencement of the retardation of the vehicle according to the vehicle's calculated retardation in order to achieve a lowering of the speed set-point value $v_{ref}$ to a maximum speed required by the hindrance at the location of the hindrance;
   G) adapting the speed set-point values $v_{ref}$ within the horizon according to said start position and the retardation of the vehicle; and
   H) regulating the vehicle's speed according to the speed set-point values $v_{ref}$.

2. A method according to claim 1, wherein the vehicle-specific values are determined by current transmission ratio, current vehicle weight, a maximum torque curve of an engine of the vehicle, mechanical friction and/or a running resistance at current speed of the vehicle.

3. A method according to claim 1, wherein the at least one characteristic indicates a hindrance in the form of a speed limit, a sharp bend, a roundabout or an intersection.

4. A method according to claim 3, wherein the maximum speed required by the hindrance limits the vehicle's speed for a predetermined length of the horizon.

5. A method according to claim 3, wherein the characteristic indicates a hindrance due to temperature.

6. A method according to claim 3, wherein regulation of the vehicle's speed to take into account hindrance is an optional setting for the driver.

7. A method according to claim 1, further comprising, after step F) a step F 1), indicating to a driver of the vehicle that a speed change is coming, whereupon step G) is performed if the driver acknowledges the indication.

8. A method according to claim 1, wherein the itinerary is determined by means of a navigation system.

9. A module for determination of speed set-values $v_{ref}$ for a vehicle's control system, the module comprising:
   a horizon unit configured and operable to determine a horizon using position data and map data of an itinerary including segments with at least one characteristic for each segment;
   a processor unit that includes a data processor, the processor unit configured and operable:
      to calculate threshold values for said at least one characteristic according to one or more vehicle-specific values,
      to compare said at least one characteristic of each segment with the calculated threshold values, and to assign each segment to a respective category according to the results of the comparisons, wherein the threshold values serve as boundaries for assigning the segments to the respective categories; and
      to calculate speed set-point values $v_{ref}$ for the vehicle's control systems across the horizon according to rules pertaining to the categories to which segments within the horizon are assigned;
   a hindrance unit configured and operable to perform the following steps when any characteristic of segments within the horizon indicates a hindrance:
   calculating a retardation of the vehicle on a supposition that brakes of the vehicle are not used according to said rules pertaining to the segment categories; and
   determining a start position within the horizon for commencement of the retardation of the vehicle according to the vehicle's calculated retardation in order to achieve a lowering of the speed set-point speed value $v_{ref}$ to a maximum speed required by the hindrance at the location of the hindrance; and
   the processor unit is further configured and operable to adapt the speed set-point value $v_{ref}$ within the horizon according to said start position and the retardation of the vehicle; and
   the control system regulates the vehicle's speed according to the speed set-point values $v_{ref}$.

10. A module according to claim 9, wherein vehicle-specific values of current transmission ratio, current vehicle weight, a maximum torque curve of an engine of the vehicle, mechanical friction and/or a running resistance at current speed are determined.

11. A module according to claim 9, wherein the hindrance unit is configured and operable to detect a hindrance within the horizon from the fact that a characteristic for a route segment indicates a speed limit, a sharp bend, a roundabout or an intersection.

12. A module according to claim 11, wherein the hindrance unit is configured and operable to determine a length of the horizon for which the maximum speed required by the hindrance limits the vehicle's speed.

13. A module according to claim 11, wherein the hindrance unit is configured and operable to determining whether the characteristic indicates a hindrance due to some other parameter.

14. A module according to claim 9, wherein the regulating the vehicle's speed to take into account the hindrance is an optional setting for the driver.

15. A module according to claim 9, wherein the hindrance unit is configured and operable to indicate for a driver of the vehicle that a speed change is coming, and to receive input data which accept or reject the speed change.

16. A module according to claim 9, wherein the horizon unit is configured and operable to determine the itinerary by reference to a navigation system.

17. A computer-readable medium incorporating a non-transitory program of instructions configured to enable a computer system to:
   A) determine a horizon using position data and map data of an itinerary including route segments with at least one characteristic for each segment;
   B) calculate threshold values for said at least one characteristic according to one or more vehicle-specific values,
   C) compare said at least one characteristic of each segment with the calculated threshold values and assign each segment within the horizon to a respective category according to the results of the comparisons, wherein the threshold values serve as boundaries for assigning the segments to the respective categories;
   D) calculate speed set-point values $v_{ref}$ for a vehicle's control system across the horizon according to rules pertaining to the categories to which segments within the horizon are assigned; and
   when any characteristic in segments within the horizon indicates a hindrance, performing the following steps:
   E) calculate a retardation of the vehicle on a supposition that the brakes are not used according to said rules pertaining to the segment categories;
   F) determine a start position within the horizon for commencement of the retardation of the vehicle according to the vehicle's calculated retardation in order to achieve a lowering of the speed set-point value $v_{ref}$ to a maximum speed required by the hindrance at the location of the hindrance;
   G) adapt the speed set-point values $v_{ref}$ within the horizon according to said start position and the retardation of the vehicle; and
   H) regulate the vehicle's speed according to the speed set-point values $v_{ref}$ when the computer program of instructions is run on said computer system.

18. A computer-readable medium according to claim 17, wherein the computer system is on-board the vehicle.

* * * * *